(12) United States Patent
England et al.

(10) Patent No.: US 6,821,667 B2
(45) Date of Patent: Nov. 23, 2004

(54) FUEL CELL STACK HAVING FOIL INTERCONNECTS AND LAMINATED SPACERS

(75) Inventors: Diane M. England, Bloomfield, NY (US); Sean M. Kelly, Churchville, NY (US); Subhasish Mukerjee, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 251 days.

(21) Appl. No.: 09/968,270

(22) Filed: Oct. 1, 2001

(65) Prior Publication Data

US 2003/0064612 A1 Apr. 3, 2003

(51) Int. Cl.$^7$ ................................................ H01M 8/02
(52) U.S. Cl. .......................................... 429/34; 429/36
(58) Field of Search ............................. 429/30, 31, 32, 429/34, 36, 18

(56) References Cited

U.S. PATENT DOCUMENTS

| | | | |
|---|---|---|---|
| 3,615,838 A | * 10/1971 | Erickson | 429/35 |
| 3,844,920 A | 10/1974 | Burgett et al. | |
| 5,219,673 A | 6/1993 | Kaun | |
| 5,505,498 A | 4/1996 | Halling et al. | |
| 5,543,239 A | 8/1996 | Virkar et al. | |
| 5,688,610 A | 11/1997 | Spaeh et al. | |
| 6,054,231 A | 4/2000 | Virkar et al. | |
| 6,074,771 A | 6/2000 | Cubukcu et al. | |
| 6,106,966 A | * 8/2000 | Crow | 429/32 |
| 6,106,967 A | * 8/2000 | Virkar et al. | 429/34 |
| 6,321,145 B1 | 11/2001 | Rajashekara | |
| 6,326,096 B1 | * 12/2001 | Virkar et al. | 429/30 |
| 6,423,896 B1 | 7/2002 | Keegan | |
| 6,455,185 B2 | 9/2002 | Bircann et al. | |
| 6,458,477 B1 | * 10/2002 | Hsu | 429/17 |
| 6,485,852 B1 | 11/2002 | Miller et al. | |
| 6,492,053 B1 | * 12/2002 | Donelson et al. | 429/34 |
| 6,509,113 B2 | 1/2003 | Keegan | |
| 6,537,629 B1 | * 3/2003 | Ensinger | 428/36.9 |
| 6,551,734 B1 | 4/2003 | Simpkins et al. | |
| 6,562,496 B2 | 5/2003 | Faville et al. | |
| 6,608,463 B1 | 8/2003 | Kelly et al. | |
| 6,613,468 B2 | 9/2003 | Simpkins et al. | |
| 6,613,469 B2 | 9/2003 | Keegan | |
| 6,627,339 B2 | 9/2003 | Haltiner, Jr. | |
| 6,630,264 B2 | 10/2003 | Haltiner, Jr. et al. | |

FOREIGN PATENT DOCUMENTS

| | | |
|---|---|---|
| EP | 0283910 | 9/1988 |
| JP | 07014591 | 1/1995 |
| WO | 00/76015 | 12/2000 |
| WO | 0076015 | 12/2000 |

OTHER PUBLICATIONS

Search report for EP application 02078692.7.
European Search Report for 02078692.7.

* cited by examiner

Primary Examiner—Frankie L. Stinson
Assistant Examiner—Monique Wills
(74) Attorney, Agent, or Firm—Paul L. Marshall

(57) ABSTRACT

Interconnects and perimeter spacers for a fuel cell stack are provided as flexible elements which can conform to non-planarities in a stack's electrolyte elements and thereby avoid inducing torsional stresses in the electrolyte elements. The interconnects are foil elements about 0.005 inches thick, formed of a superalloy such as Hastelloy, Haynes 230, or a stainless steel. The perimeter spacers comprise a plurality of laminate thin spacer elements, each thin spacer element being a laminate of superalloy and a "soft" material such as copper, nickel, or mica. The spacer elements can slide past one another; thus the perimeter spacers can be physically thick, to form the gas flow spaces within the stack, while also being torsionally flexible.

9 Claims, 4 Drawing Sheets

FUEL CELL STACK HAVING FOIL INTERCONNECTS AND LAMINATED SPACERS

TECHNICAL FIELD

The present invention relates to fuel cells; more particularly, to stacks comprising a plurality of individual cells being both physically separated and electrically connected by interconnect elements; and most particularly, to such a fuel cell stack wherein the interconnect elements are thin foils and the spacers are laminates of foils formed alternately of superalloy and a compliant material.

BACKGROUND OF THE INVENTION

Fuel cells which generate electric current by controllably combining elemental hydrogen and oxygen are well known. In one form of such a fuel cell, an anodic layer and a cathodic layer are separated by a permeable electrolyte formed of a ceramic solid oxide. Such a fuel cell is known in the art as a "solid oxide fuel cell" (SOFC). Either pure hydrogen or reformate is flowed along the outer surface of the anode and diffuses into the anode. Oxygen, typically from air, is flowed along the outer surface of the cathode and diffuses into the cathode. Each $O_2$ molecule is split and reduced to two $O^{-2}$ ions at the cathode/electrolyte interface. The oxygen ions diffuse through the electrolyte and combine at the anode/electrolyte interface with four hydrogen ions to form two molecules of water. The anode and the cathode are connected externally through the load to complete the circuit whereby four electrons are transferred from the anode to the cathode. When hydrogen is derived from "reformed" hydrocarbons, the "reformate" gas includes CO which is converted to $CO_2$ at the anode/electrolyte interface. Reformed gasoline is a commonly used fuel in automotive fuel cell applications.

A single cell is capable of generating a relatively small voltage and wattage, typically about 0.7 volts and less than about 2 watts per $cm^2$ of active area. Therefore, in practice it is usual to stack together in electrical series a plurality of cells. Because each anode and cathode must have a free space for passage of gas over its surface, the cells are separated by perimeter spacers which are vented to permit flow of gas to the anodes and cathodes as desired but which form seals on their axial surfaces to prevent gas leakage from the sides of the stack. Adjacent cells are connected electrically by "interconnect" elements in the stack, the outer surfaces of the anodes and cathodes being electrically connected to their respective interconnects by electrical contacts disposed within the gas-flow space, typically by a metallic foam or a metallic mesh which is readily gas-permeable or by conductive filaments. The outermost, or end, interconnects of the stack define electrical terminals, or "current collectors," connected across a load.

In the prior art, the interconnect elements are relatively thick, flat plates formed of a superalloy or stainless steel. Also, the perimeter spacers that form the gas flow spaces adjacent to the electrodes are typically formed from sheet stock having a thickness selected to yield a desired height of the flow space.

One problem encountered in prior art fuel cell stacks is that they are relatively bulky and heavy. It is very desirable to reduce the height and weight of a stack without sacrificing performance.

Another problem encountered in some prior art fuel cell stacks involves the brittleness of the ceramic oxide electrolyte elements. In some fuel cells, the anode is a relatively thick structural element supporting a thin electrolyte layer and a thin cathode layer. Such a fuel cell is said to be "anode-supported." The ceramic oxide electrolyte elements, which extend to the edges of the stack in contact with the anodes, typically are not optically flat and are also quite brittle. The anodes may also not be optically flat. Prior art perimeter spacers, being monolithic, cannot twist to accommodate non-planarities in the electrolyte elements and anodes, so that sealing between the non-flat surfaces becomes difficult. Also, because of the non-flat surfaces, an electrolyte element may be cracked during assembly of the stack. In either case, failure of the stack can occur. Avoiding these problems by finishing the electrolyte elements to be optically flat is cost-prohibitive.

It is a principal object of the present invention to provide a fuel cell stack that is lighter and smaller than prior art fuel cells of the same electrical capacity.

It is a further object of the present invention to provide spacer means for a fuel cell stack that can sealably conform to non-planarities in the electrolyte elements and will not induce torsional stress in such elements.

SUMMARY OF THE INVENTION

Briefly described, the interconnects and perimeter spacers for a fuel cell stack are provided as flexible elements which can conform to non-planarities in a stack's elements. The interconnects are foil elements about 0.005 inches thick, formed of a super alloy, such as HASTELLOY or HAYNES 230, or stainless steel. The thick perimeter spacers comprise a plurality of thin spacer elements. Each spacer element is a laminate of a superalloy and a compliant soft material such as copper, nickel, or mica. The spacer elements can slide past one another; thus the perimeter spacers can be physically thick, to form gas flow spaces within the stack, while also being torsionally flexible.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
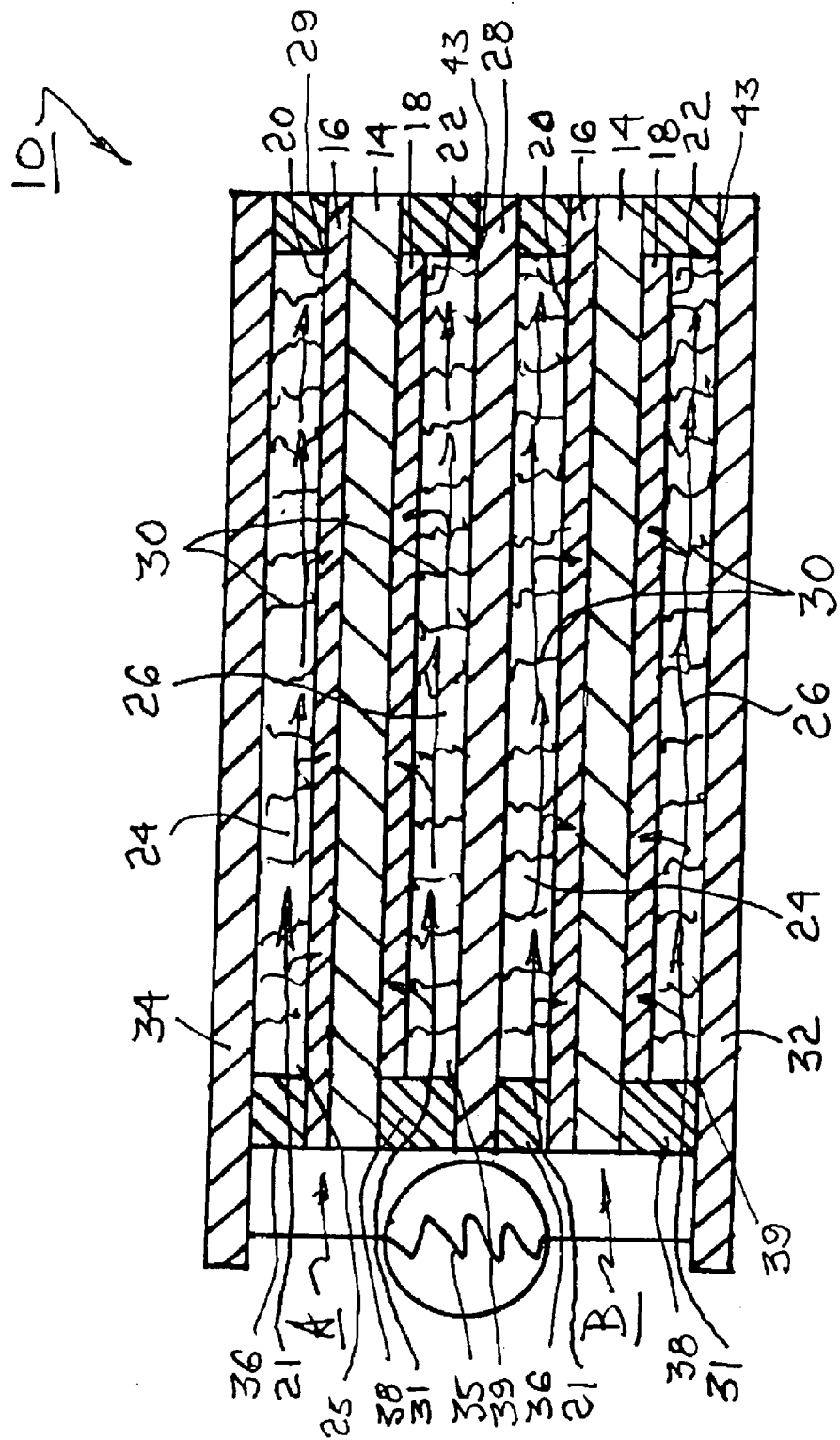
FIG. 1 is a schematic cross-sectional view of a prior art two-cell stack of solid oxide fuel cells.

Referring to FIG. 1, a prior art fuel cell stack 10 includes elements normal in the art to solid oxide fuel cell stacks comprising more than one fuel cell. The example shown includes two fuel cells A and B, connected in series, and is of a class of such fuel cells said to be "anode-supported" in that the anode is a structural element having the electrolyte and cathode deposited upon it. Element thicknesses as shown are not to scale.

Each fuel cell includes an electrolyte element 14 separating an anodic element 16 and a cathodic element 18. Each anode and cathode is in direct chemical contact with its respective surface of the electrolyte, and each anode and cathode has a respective free surface 20,22 forming one wall of a respective passageway 24,26 for flow of gas across the surface. Anode 16 of fuel cell B faces and is electrically connected to an interconnect 28 by filaments 30 extending across but not blocking passageway 24. Similarly, cathode 18 of fuel cell A faces and is electrically connected to interconnect 28 by filaments 30 extending across but not blocking passageway 26. Similarly, cathode 18 of fuel cell B faces and is electrically connected to a cathodic current collector 32 by filaments 30 extending across but not blocking passageway 26, and anode 16 of fuel cell A faces and is electrically connected to an anodic current collector 34 by filaments 30 extending across but not blocking passageway 24. Current collectors 32,34 may be connected across a load 35 in order that the fuel cell stack 10 performs electrical work. Passageways 24 are formed by anode spacers 36 between the perimeter of anode 16 and either interconnect 28 or anodic current collector 34. Passageways 26 are formed by cathode spacers 38 between the perimeter of electrolyte 14 and either interconnect 28 or cathodic current collector 32.

Figure 2:
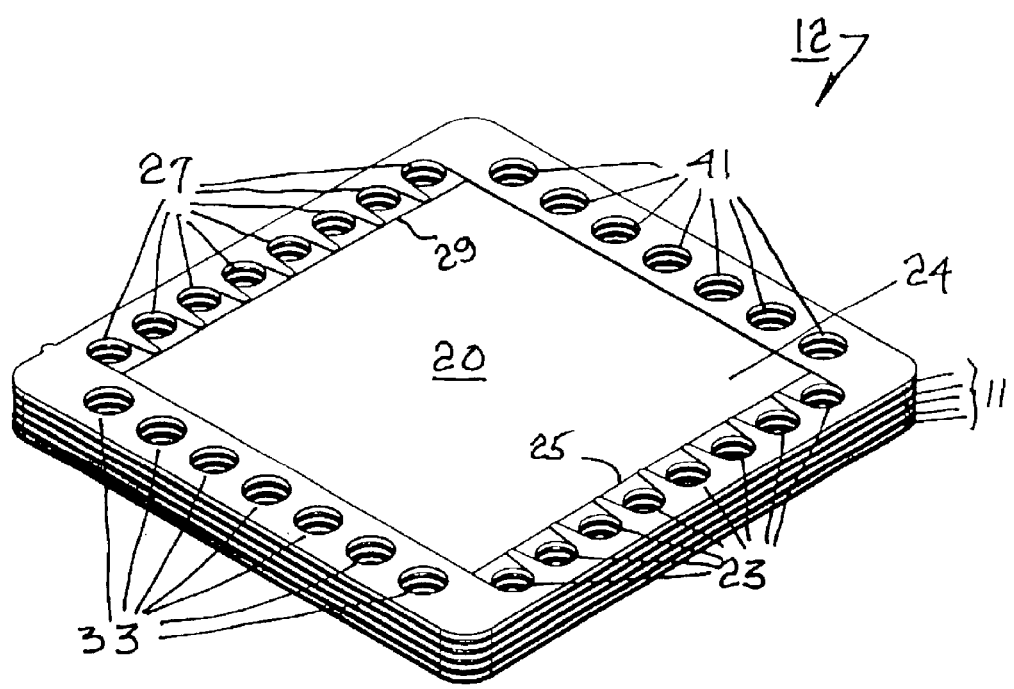
FIG. 2 is an isometric view of a fuel-cell stack comprising five cells.
Figure 3:
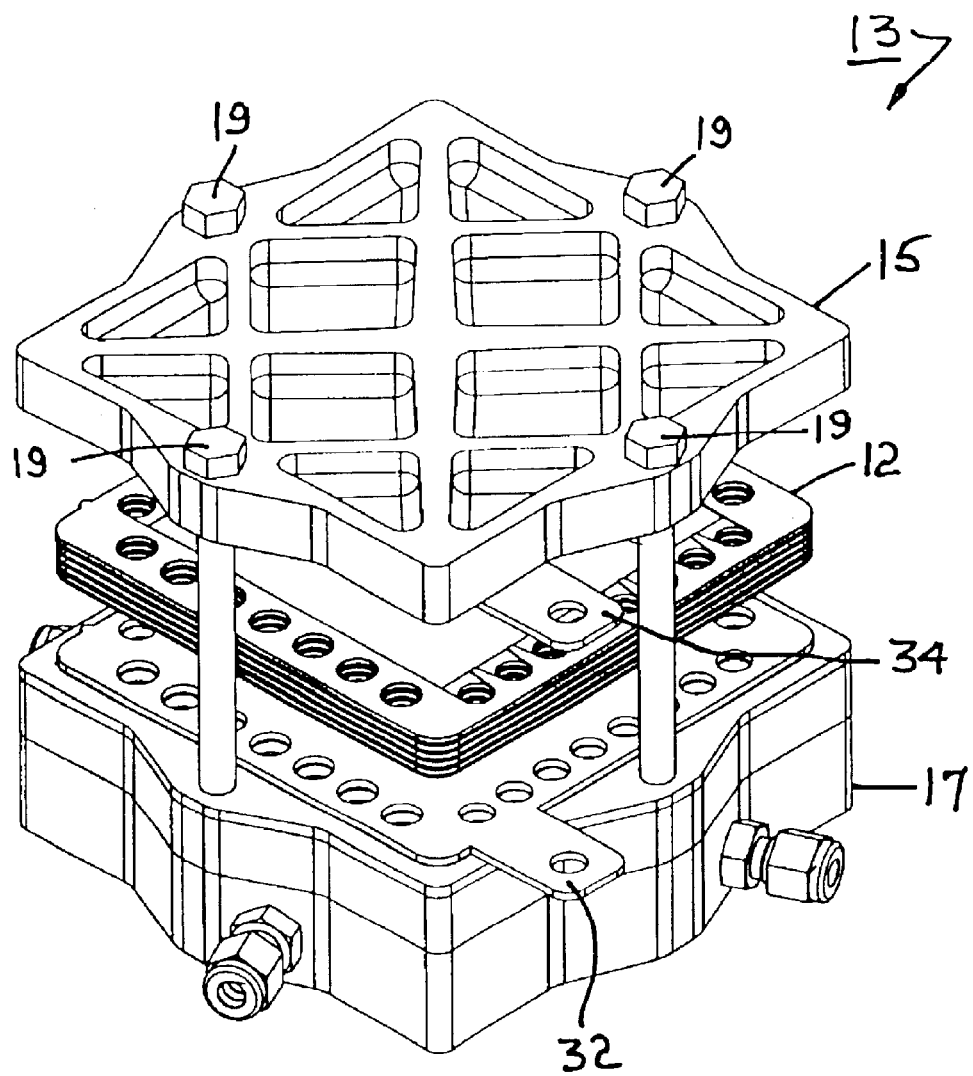
FIG. 3 is an isometric view like that shown in FIG. 2, showing the addition of current collectors, end plates, and bolts to form a complete fuel cell stack (exploded view) ready for use.

Referring to FIGS. 2 and 3, a plurality of individual fuel cells may be stacked together to form a stack 12 similar to schematic stack 10 shown in FIG. 1. Stack 12 comprises five such cells. To form a complete working fuel cell assembly 13 (FIG. 3), stack 12 is sandwiched between an anodic current collector 34 and a cathodic current collector 32 which in turn are sandwiched between a top plate 15 and a gas-manifold base 17, the entire assembly being sealingly bound together by bolts 19 extending through bores in top plate 15 and threadedly received in bores in base 17.

Preferably, the interconnect and the current collectors are formed of an alloy, typically a "superalloy," which is chemically and dimensionally stable at the elevated temperatures necessary for fuel cell operation, generally about 750° C. or higher, for example, HASTELLOY, HAYNES 230, or a stainless steel. The electrolyte is formed of a ceramic oxide and preferably includes zirconia stabilized with yttrium oxide (yttria), known in the art as YSZ. The cathode is formed of, for example, porous lanthanum strontium manganate or lanthanum strontium iron, and the anode is formed, for example, of a mixture of nickel and YSZ.

In operation (FIG. 1), reformate gas 21 is provided to passageways 24 at a first edge 25 of the anode free surface 20, flows parallel to the surface of the anode across the anode in a first direction, and is removed at a second and opposite edge 29 of anode surface 20. Hydrogen and CO diffuse into the anode to the interface with the electrolyte. Oxygen 31, typically in air, is provided to passageways 26 at a first edge 39 of the cathode free surface 22, flows parallel to the surface of the cathode in a second direction orthogonal to the first direction of the reformate (second direction omitted for clarity in FIG. 1), and is removed at a second and opposite edge 43 of cathode surface 22. Molecular oxygen gas ($O_2$) diffuses into the cathode and is catalytically reduced to two $O^{-2}$ ions by accepting four electrons from the cathode and the cathodic current collector 32 (cell B) or the interconnect 28 (cell A) via filaments 30. The electrolyte is permeable to the $O^{-2}$ ions which pass by electric field through the electrolyte and combine with four hydrogen atoms to form two water molecules, giving up four electrons to the anode and the anodic current collector 34 (cell A) or the interconnect 28 (cell B) via filaments 30. Thus cells A and B are connected in series electrically between the two current collectors, and the total voltage and wattage between the current collectors is the sum of the voltage and wattage of the individual cells in a fuel cell stack.

Figure 4:
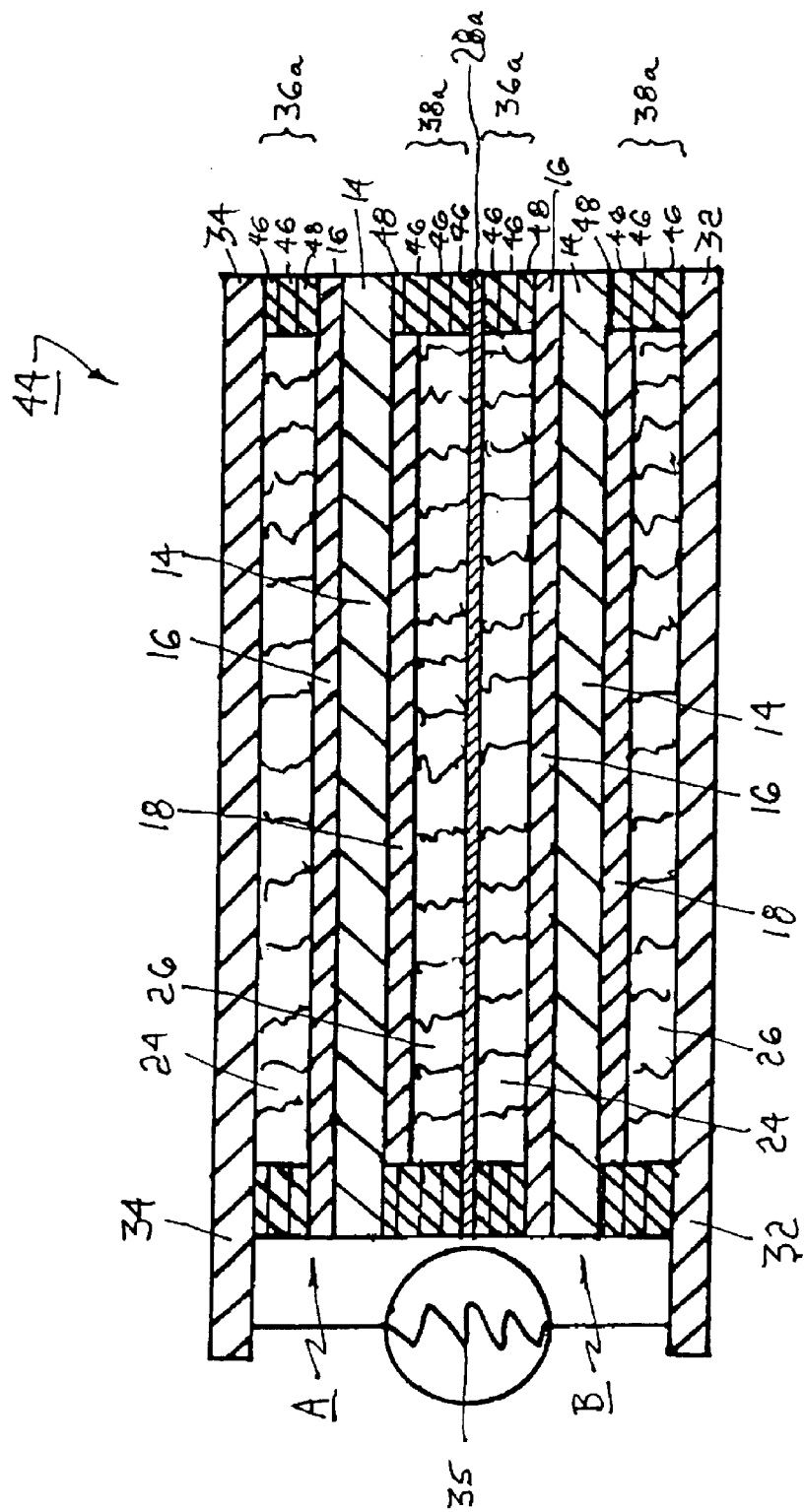
FIG. 4 is a schematic cross-sectional view of a two-cell stack of solid oxide fuel cells in accordance with the invention, showing the use of a laminate foil spacers and a foil interconnect element for providing the reformate and air flow passageways across the anodes and cathodes, respectively.

FIG. 4 shows an improved two-cell stack 44 in accordance with the invention. Stack 44 is similar to prior art stack 10 shown in FIG. 1 but incorporates several improvements over the prior art.

First, prior art interconnect element 28 is relatively thick, heavy, and inflexible, having a typical thickness of about 3.5 mm or greater. Its thickness and weight contribute to the overall weight and size of a prior art stack, and its inflexibility contributes to the risk of cracking a non-planar electrolyte element or compromising the sealability between elements, as discussed above. Improved interconnect element 28a is formed as a flexible foil having a thickness of less than about 0.5 mm and preferably about 0.127 mm (0.005 inch). Like the prior art interconnect 28, foil interconnect 28a is preferably formed of an alloy which is chemically and dimensionally stable at the elevated temperatures necessary for fuel cell operation, for example, a superalloy such as HASTELLOY, HAYNES 230, or a stainless steel.

Second, prior art anode spacer 36 and cathode spacer 38 are monolithic and formed from sheet stock having a thickness selected to yield the desired height of the anode passageways 24 and cathode passageways 26. Being inflexible, the prior art spacers also contribute to the risk of cracking a non-planar electrolyte element upon assembly of the stack as shown in FIG. 3, and/or compromising the sealability between the elements. As shown in FIG. 4, prior art spacers 36,38 are replaced by improved spacers 36a,38a, each comprising a plurality of thin elements 46, each preferably about 0.127 mm in thickness. Each element 46 is formed as a laminate comprising a superalloy and a soft and malleable material such as copper, nickel, or mica. Preferably, a foil of dielectric soft material, such as mica 48, is placed next to each of electrolyte elements 14 and anodes 16 to insulate the foil interconnect 28a electrically from short-circuiting through the electrolyte elements, as shown in FIG. 4, and to seal against gas leakage. Phologopite or fluorophlogopite mica is especially effective at sealing against the irregular and porous surface of the electrolyte.

Using a plurality of thin spacers allows the height of the flow spaces to be varied as may be desired among different fuel cell stacks simply by varying the number of spacers included for each flow space. For example, in a currently preferred embodiment of a fuel cell stack, cathode flow space 26 is formed by five such spacers and anode flow space 24 is formed by three such spacers. Further, selection of spacer materials according to their thermal expansion properties allows the yield strength and thermal expansion of a stack to be specified, and thermal expansion of the spacers can provide sealing force for the seals against the electrolyte elements and the interconnect and current collectors. Further, forming thick spacers by assembling a plurality of thin laminated foil spacers, such that the foils may slide past one another as needed, results in a thick spacer which is nonetheless sufficiently flexible to conform to a non-planar electrolyte element without cracking it.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A perimeter spacer for use in a fuel cell stack, comprising a plurality of laminate spacer elements positioned adjacent to one another, at least one of said spacer elements being formed of a superalloy and a soft material, wherein said soft material is selected from the group consisting of copper, mica and dielectric materials.

2. A perimeter spacer in accordance with claim 1 wherein said mica is a dielectric material.

3. A perimeter spacer in accordance with claim 1 configured for spacing an electrolyte element from an interconnect element, wherein said perimeter spacer includes between two and ten laminate spacer elements.

4. A perimeter spacer in accordance with claim 2 wherein at least one of the outermost of the laminate spacer elements is formed of mica for sealing and insulating disposition against an electrolyte element in said fuel cell stack.

5. A fuel cell stack for generating an electric current, comprising:
   a) a first anode and a first cathode in a first fuel cell;
   b) a second anode and a second cathode in a second fuel cell adjacent said first fuel cell in said stack;
   c) a foil interconnect element disposed between said first anode and said second cathode to electrically connect said first and second fuel cells, wherein the thickness of said interconnect element is between about 0.5 mm and 0.254 mm;
   d) an electrolyte element disposed in said second fuel cell adjacent said second anode; and
   e) at least one perimeter spacer including a plurality of laminate thin spacers positioned adjacent to one another, wherein said plurality of laminate thin spacers are disposed between said electrolyte element and said interconnect.

6. A fuel cell stack in accordance with claim 5 wherein a laminate thin spacer in contact with said electrolyte element is formed at least partly of mica.

7. A fuel cell stack for generating an electric current, comprising:
   a) a first anode and a first cathode in a first fuel cell;
   b) a second anode and a second cathode in a second fuel cell adjacent said first fuel cell in said stack; and
   c) a foil interconnect element disposed between said first anode and said second cathode to electrically connect said first and second fuel cells, wherein the thickness of said interconnect element is between about 0.5 mm and 0.254 mm; and
   d) a perimeter spacer including a plurality of laminate thin spacers positioned adjacent to one another, wherein said plurality of laminate thin spacers are disposed between said first anode and said interconnect.

8. A fuel cell stack in accordance with claim 7 wherein a laminate thin spacer in contact with said anode is formed at least partly of mica.

9. An automotive vehicle including a fuel cell stack for generating an electric current, wherein said fuel cell stack comprises:
   a) a first anode and a first cathode in a first fuel cell;
   b) a second anode and a second cathode in a second fuel cell adjacent said first fuel cell in said stack;
   c) a foil interconnect element disposed between said first anode and said second cathode to electrically connect said first and second fuel cells;
   d) an electrolyte element disposed in said second fuel cell adjacent said second anode; and
   e) at least one perimeter spacer including a plurality of laminate thin spacers positioned adjacent to one another, wherein said plurality of laminate thin spacers are disposed between said electrolyte element and said interconnect.

* * * * *